(12) United States Patent
Watanabe et al.

(10) Patent No.: US 8,529,141 B2
(45) Date of Patent: Sep. 10, 2013

(54) CAMERA

(75) Inventors: Kentaro Watanabe, Yokohama (JP); Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/448,183

(22) Filed: Apr. 16, 2012

(65) Prior Publication Data

US 2012/0269502 A1 Oct. 25, 2012

(30) Foreign Application Priority Data

Apr. 20, 2011 (JP) .................. 2011-094174

(51) Int. Cl.
*G03B 19/12* (2006.01)
(52) U.S. Cl.
USPC ........................ 396/358; 396/354
(58) Field of Classification Search
USPC .................. 396/354, 358
See application file for complete search history.

(56) References Cited

U.S. PATENT DOCUMENTS

| 3,736,850 A | * | 6/1973 | Ishikawa ................. 396/317 |
| 4,163,612 A | * | 8/1979 | Ueda et al. ............... 396/357 |
| 4,260,232 A | * | 4/1981 | Ueda et al. ............... 396/357 |

FOREIGN PATENT DOCUMENTS

JP 2006-3463 A 1/2006

* cited by examiner

*Primary Examiner* — Clayton E Laballe
*Assistant Examiner* — Warren K Fenwick
(74) *Attorney, Agent, or Firm* — Canon U.S.A., Inc., IP Division

(57) ABSTRACT

A camera including a drive source, where the drive source is driven so that a charge member enters a moving locus of a mirror drive member when driving a mirror from a mirror down position to a mirror up position. After the charge member has entered the moving locus of the mirror drive member, the mirror drive member is moved from the mirror down position to the mirror up position by an urging force of the mirror drive spring.

5 Claims, 10 Drawing Sheets

CAMERA

BACKGROUND OF THE INVENTION

1. Field of the Invention

The present invention relates to a camera, such as a single-lens reflex camera, and particularly to a camera including a rotatable mirror mechanism.

2. Description of the Related Art

The single-lens reflex camera has a mirror that is flipped up and down relative to the photographic optical path. It is well known that by driving the mirror at high speed, finder missing time due to mirror up/down motion can be reduced and continuous shooting speed can be increased. (Japanese Patent Application Laid-Open No. 2006-3463)

However, when the mirror is driven at high speed, the mirror hits stoppers of the drive mechanism, producing a large vibration to the camera. As a result, image burr occurs due to the large vibration produced when the mirror retreats to its up state to get out of the photographic optical path, particularly during long exposure with a telephoto lens.

SUMMARY OF THE INVENTION

According to an aspect of the present invention, a camera includes a mirror, a mirror drive member configured to drive the mirror by moving between a first and a second position, a mirror drive spring configured to urge the mirror drive member to the first position, a charge member configured to charge the mirror drive spring by moving the mirror drive member from the first position to the second position, and a drive source configured to drive the charge member. The drive source is driven so that the charge member enters a moving locus of the mirror drive member when the mirror drive member is moved from the second position to the first position. After the charge member has entered the moving locus, the mirror drive member is moved from the second position to the first position by an urging force of the mirror drive spring.

According to exemplary embodiments of the present invention, a camera provided with a simplified mirror drive mechanism can reduce the mirror driving speed in a mirror-up operation.

Further features and aspects of the present invention will become apparent from the following detailed description of exemplary embodiments with reference to the attracted drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Exemplary embodiments of the camera according to the present invention will be described with reference to the accompanying drawings. A camera according to an exemplary embodiment can be applied to single-lens still cameras using silver salt film or single-lens reflex digital cameras using a CCD type or a MOS type solid-state image sensor.

Figure 1:
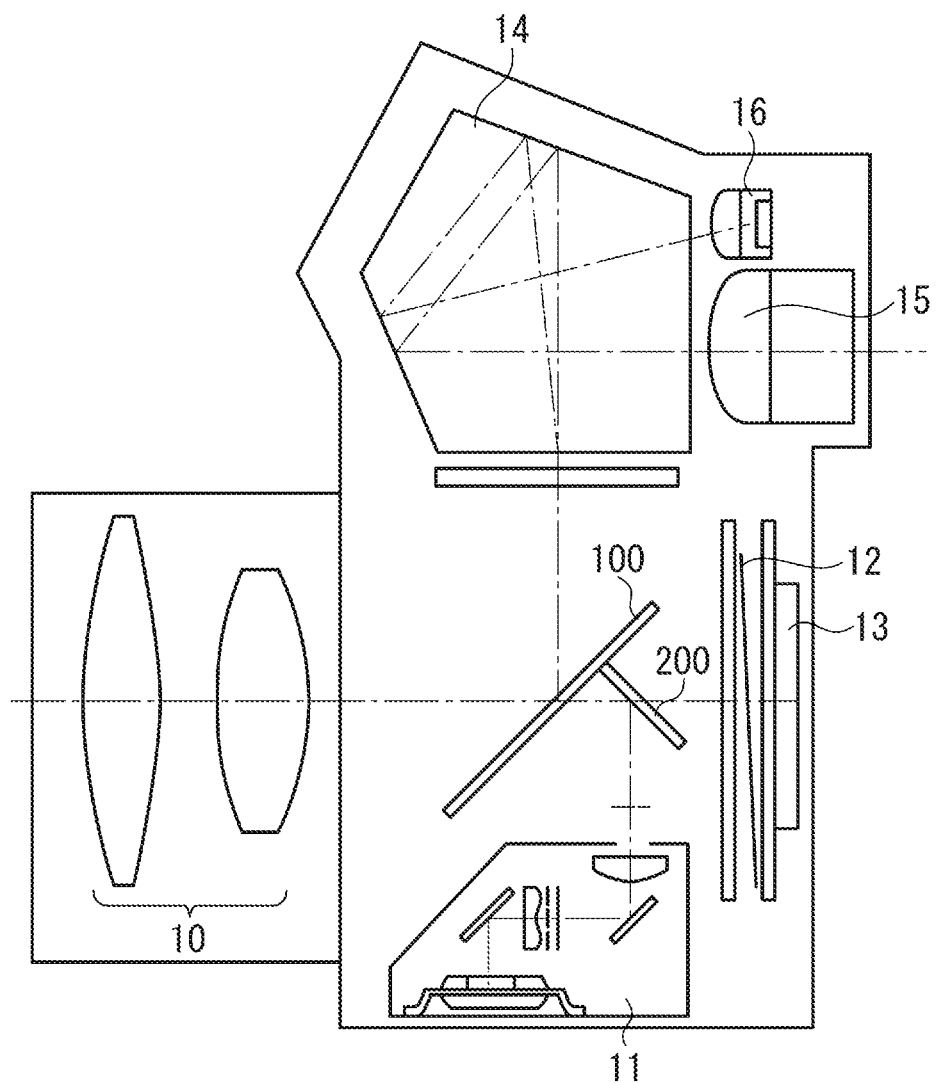
FIG. 1 is a schematic diagram illustrating an overall structure of a camera according to an embodiment of the present invention.

FIG. 1 is a diagram illustrating a general interior structure of a single-lens reflex digital camera according to an exemplary embodiment of the invention.

In FIG. 1, an image taking lens 10 is detachably mounted to a main body of a digital camera. An object image is formed on a focusing screen by the image taking lens 10. The image taking lens 10 includes a lens drive unit (not illustrated) diaphragm blades provided to control exposure, and a diaphragm drive unit configured to drive the diaphragm blades.

A main mirror 100 is formed by a half mirror. When the main mirror is in a down state, an object image formed by the image taking lens 10 is reflected to a focusing screen. At this time, the main mirror 100 transmits a part of the object image to a sub mirror 200. The sub mirror 200 reflects the part of the object light transmitted through the main mirror 100, to a focus detection unit 11.

The main mirror 100, driven by a mirror drive mechanism, can be positioned in the photographic optical path and placed in the mirror down state, in which the object image is led to the focusing screen, or the main mirror 100 can be retracted out of the optical path and placed in the mirror up state, in which the object image is led to the image sensor 13.

The sub mirror 200 is displaced in conjunction with the main mirror 100 when the main mirror 100 is driven by the mirror drive mechanism. In other words, when the main mirror 100 comes into the down state, the sub mirror 200 reflects a light flux transmitted through the main mirror 100 to the focus detection unit 11. When the main mirror 100 gets into the up state, the sub mirror 200 retracts, together with the main mirror 100, outside the photographic optical path.

A pentaprism 14 converts the object image formed on the focusing screen into an erected normal image and reflects the converted image.

An eyepiece lens 15 sends the erected normal image, which has been produced and reflected by the pentaprism 14, to the eye of the photographer.

Exposure is controlled according to an output signal of a light measuring unit 16 which measures, via the pentaprism 14, a luminance of the object image formed on the focusing screen.

The focus detection unit 11 detects a defocus amount of the object image. According to an output signal of the focus detection unit 11, the lens drive unit of the image-taking lens 10 is controlled and the focus is adjusted.

A shutter unit 12 mechanically controls incidence of the object light flux to the image forming surface. The image sensor 13 captures the object image formed by the image-taking lens 10 and converts it to an electrical signal. The image sensor 13 includes a two-dimensional imaging device, such as a charge-coupled device (CCD) or a metal-oxide semiconductor (MOS).

The shooting operation of a digital camera according to the present exemplary embodiment will now be described.

Before the shooting operation, an object image entering the image-taking lens can be recognized by the photographer through the main mirror 100, the pentaprism 14, and the eyepiece lens 15. At this time, a part of the object image enters the focus detection unit 11 from the sub mirror 200. When the photographer performs a switching operation, object distance information is detected by the focus detection unit. According to the distance information, the image-taking lens 10 can be driven and the focus can be adjusted. In addition, the luminance of the object is measured by the light measuring unit 16 and an aperture diaphragm value and exposure time are determined.

When the photographer releases the shutter, the main mirror 100 and the sub mirror 200 are retracted upward from the optical path of the objective lens, the blades of the shutter 12 are opened, and the object image is projected to the image sensor.

After a passage of appropriate exposure time, the opening is closed by the blades of the shutter 12, and the main mirror 100 and the sub mirror 200 return to the optical path. Then the shooting operation is completed.

In the digital camera according to the present exemplary embodiment, the main mirror 100 and the sub mirror 200 can be driven in a first mirror drive mode or in a second mirror drive mode. The mirror up operation varies depending on whether the photographer sets the first mirror drive mode or the second mirror drive mode.

According to the present exemplary embodiment, the user can select and set either the first mirror drive mode or the second mirror drive mode. The second mirror drive mode automatically turns on when, for example, the mirror-up shooting mode, bulb shooting mode, live view shooting mode, or moving image shooting mode has been selected.

The operation of the mirror drive mechanism will now be described with reference to FIGS. 2A, 2B and 2C.

Figure 2A:
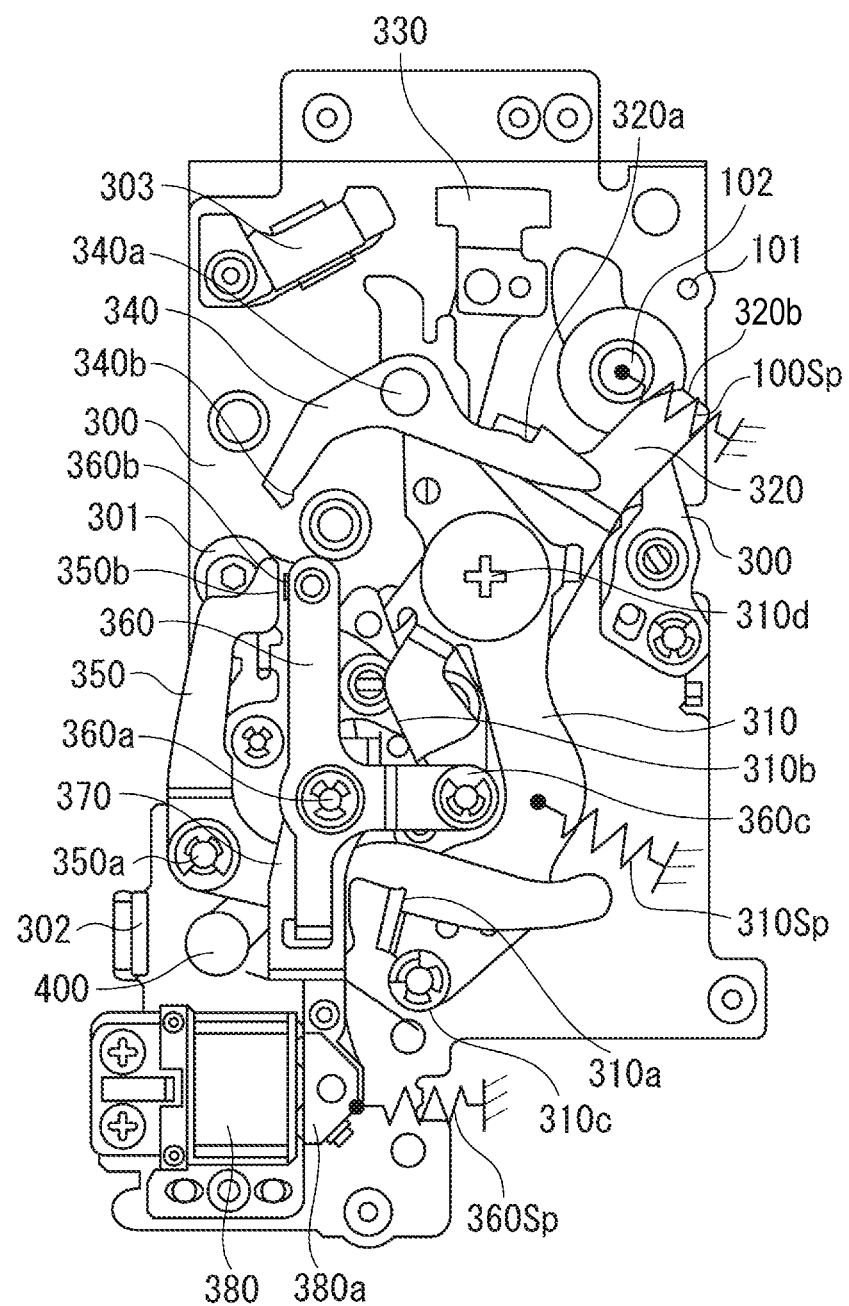
FIGS. 2A, 2B and 2C are diagrams illustrating the operation of a mirror drive mechanism.

FIG. 2A illustrates the mirror drive mechanism in the stand-by mode before the shutter is released. More specifically, the mirror is put in the down state and charge operations are completed.

A base plate 300, on which the mirror drive mechanism is arranged, includes a hole where a rotational center axis 101 of the main mirror 100 is mounted, and a circular-arc hole in which a drive shaft 102 of the main mirror 100 is rotatably mounted. A mirror down spring 100Sp, which is configured to urge the main mirror 100 downward, is attached to the drive shaft 102 of the main mirror 100.

A mirror lever 310 configured to drive the mirror rotates around a rotational center 310d. A down hook lever 340 is attached to the mirror lever 310. The down hook lever 340 rotates around a rotational center 340a. An attraction lever 370 and a detaching lever 360 integrally rotate around a rotational center 360a of the detaching lever 360. An attraction block 380a of an electromagnet 380 is fixed to a head of the attraction lever 370.

The electromagnet 380 includes a magnet, a coil and a yoke, where the yoke is in close contact with the attraction block 380a by a magnetic force when the electromagnet is in a non-conducting state. When the coil is energized, the magnetic force is cancelled and the attraction block 380a is detached.

The detaching spring 360Sp applies a force to urge the attraction block 380a to move in a direction of detachment. In other words, the detaching spring 360Sp urges the attraction lever 370 in a counterclockwise direction to rotate the lever 370 around rotational center 360a of the detaching lever 360. When the attraction block 380a is attracted to the yoke, the attraction block 380a is held in contact with the yoke by a force larger than the urging force of the detaching spring 360Sp.

In a stand-by mode before the shutter is released, as illustrated in FIG. 2A, an upper hook lever 350 engages with the stopper 310a of the mirror lever 310. In the stand-by mode, the mirror lever 310 stays in the state illustrated in FIG. 2A, despite the urging force of the mirror up spring 310Sp. When the mirror lever 310 is in the condition in FIG. 2A, the mirror lever 310 is in the second position. Therefore, the mirror up spring 310Sp acts as a mirror drive spring provided to urge the mirror lever 310. Under the condition illustrated in FIG. 2A, the down hook lever 340 engages with a stopper 320a of the mirror drive lever 320.

The mirror up operation in the first mirror drive mode is described below.

In response to a release signal, a camera control unit applies an electric pulse to the electromagnet 380. When the electrical pulse is applied to the electromagnet 380, the attraction lever 370 having the attraction block 380a attached thereto, and the detaching lever 360 moving in conjunction with the attraction lever 370, are rotated counterclockwise around the rotational center 360a of the detaching lever 360, under the spring force of the detaching spring 360Sp. When the detaching lever 360 rotates counterclockwise, the roller 360b of the detaching lever 360 comes into contact with a contact portion 350b of the up hook lever 350, and the up hook lever 350 rotates counterclockwise around the rotational center 350a. As the up hook lever 350 rotates counterclockwise, the engagement of the up hook lever 350 with the stopper 310a of the mirror lever 310 is released.

When the engagement of the up hook lever 350 with the stopper 310a of the mirror lever 310 is released under the spring force of the mirror up spring 310Sp, the mirror lever 310 rotates counterclockwise around the rotational center 310d. At this time, because the stopper 320a of the mirror drive lever 320 engages with the down hook lever 340, the mirror drive lever 320 rotates counterclockwise around the rotational center 310d of the mirror 310. At this time, a cam 320b of the mirror drive lever 320 pushes up the main mirror drive shaft 102 to carry out a mirror up operation.

Because the urging force of the mirror up spring 310Sp is sufficiently larger than the urging force of the mirror down spring 100Sp, the mirror up operation can be performed at high speed.

Figure 2B:
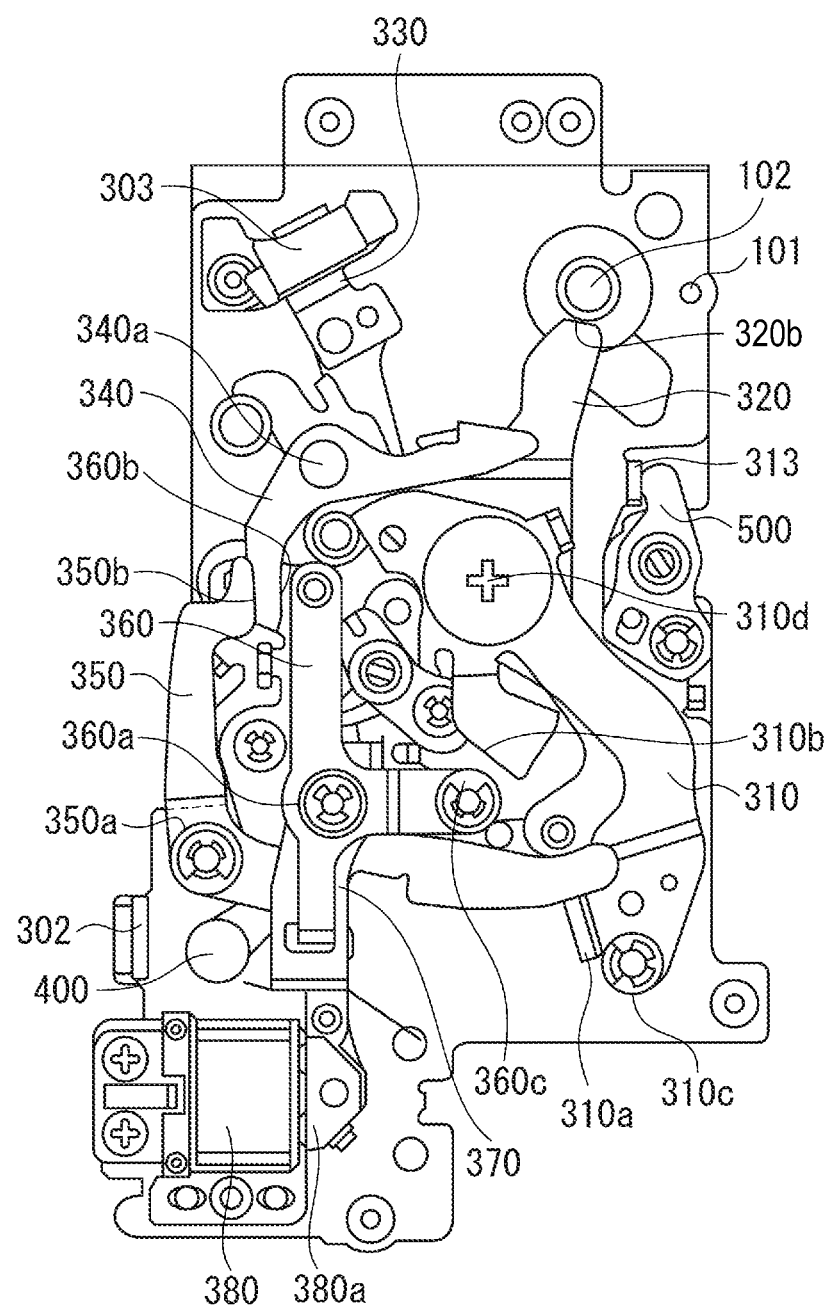

FIG. 2B illustrates the state when the mirror up operation is finished. The mirror lever 310 illustrated in FIG. 2B is located in a first position.

A motion detecting unit 330 fixed to the mirror drive lever 320 detects, with an up switch having a photo-interrupter, that a mirror up operation has been completed.

The mirror lever 310 has an attraction cam 310b. When the mirror lever 310 rotates counterclockwise, the attraction cam 310b contacts roller 360c of the detachment lever 360 and causes the detachment lever 360 to rotate clockwise in despite the urging force of the detachment spring 360Sp. As the detachment lever 360 rotates clockwise, the detachment lever 360 again attracts the attraction block 380a, which has been detached, to the electromagnet 380.

The stopper 320a of the mirror drive lever 320 engages with the down hook lever 340, so that the down hook lever 340, which moves integrally with the mirror lever 310 and the mirror drive lever 320, rotates counterclockwise around the rotational center 310d of the mirror lever 310. The mirror lever 310 located in the position illustrated in FIG. 2B is located in the first position.

An engagement releasing portion 340b of the down hook lever 340 moves to a position where the portion 340b is able to contact the roller 360b of the detachment lever 360. After the vibration caused by the mirror up operation lessens, an exposure operation takes place, followed by the mirror down operation.

The mirror down operation will now be described.

When the mirror is in the up position as illustrated in FIG. 2B, a camera control unit applies an electric pulse to the electromagnet 380. When the electric pulse is applied to the electromagnet 380, the attraction lever 370 mounted with the attraction block 380a and detachment lever 360 are rotated under the urging force of the detachment spring 360Sp.

By the counterclockwise rotation of the detachment lever 360, the roller 360b of the detachment lever 360 contacts the engagement releasing portion 340b of the down hook lever 340, causing the down hook lever 340 to rotate clockwise around the rotational center 340a. Consequently, the engagement of the down hook lever 340 with the stopper 320a of the mirror drive lever 320 is released. When the engagement of the down hook lever 340 with the stopper 320a of the mirror drive lever 320 is released, the urging force of the mirror down spring 100Sp acts on the main mirror drive shaft 102. As a result, the mirror drive lever 320 rotates clockwise around the rotational center 310d of the mirror lever 310.

Figure 2C:
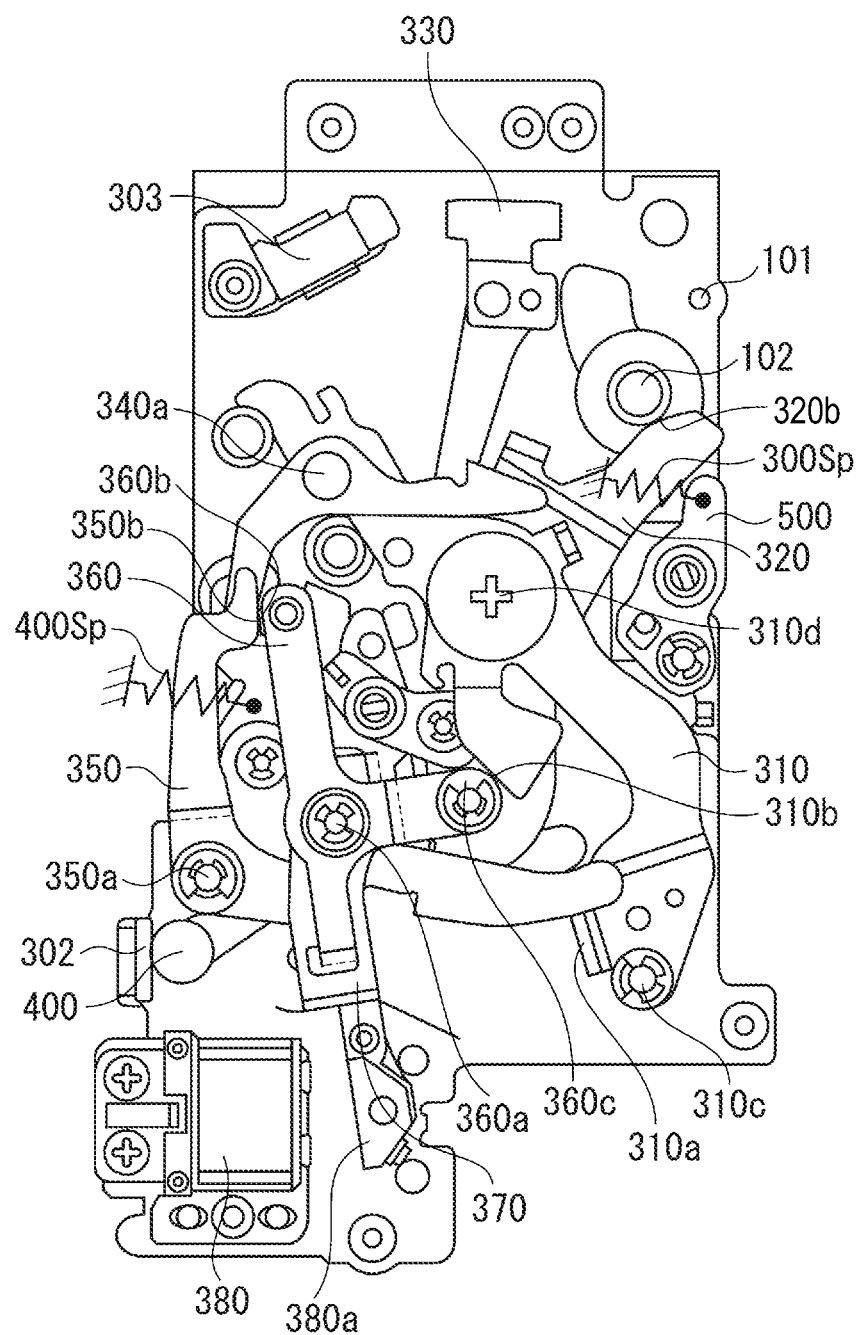

FIG. 2C illustrates the state when the mirror down operation is finished.

A main mirror balancer 400 is mounted on a base plate 300 of a mirror box. When the main mirror balancer 400 contacts the main mirror, the main mirror balancer 400 rotates clockwise despite the urging force of a main mirror balancer spring 400Sp, thereby reducing the impact of the down motion of the main mirror 100. Moreover, when the main mirror balancer 400 clockwise rotates, at the end portion of the rotation, the main mirror balancer 400 hits the shock absorber 302 to reduce the impact of the main mirror balancer 400.

A sub mirror balancer 500 is mounted on the base plate 300 of the mirror box. When the sub mirror balancer 500 contacts the sub mirror 200, the sub mirror balancer 500 rotates clockwise despite the force of the sub mirror balancer spring 500SP, thereby reducing the impact in the down operation of the sub mirror 200.

The mirror charge mechanism will now be described with reference to FIG. 3.

Figure 3:
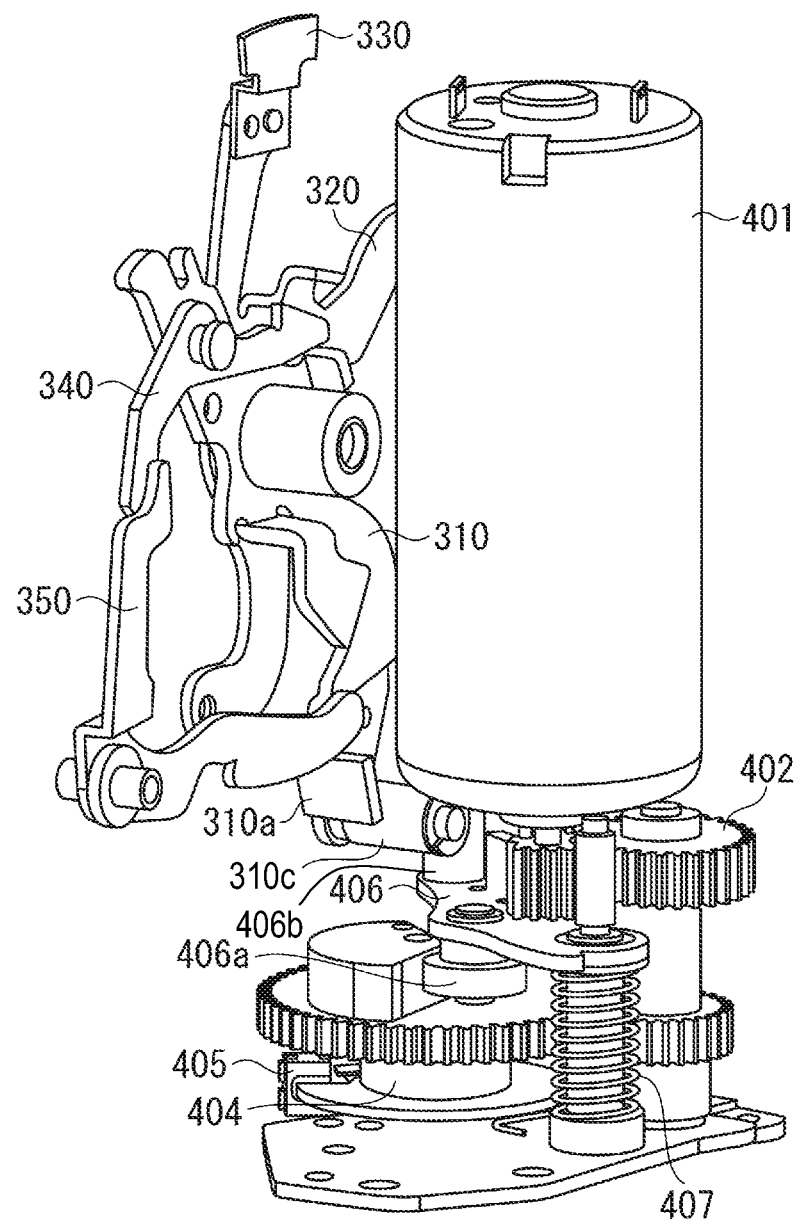
FIG. 3 is a diagram illustrating a mirror charge drive mechanism.

As illustrated in FIG. 3, the mirror charge mechanism is mounted adjacent to the mirror drive mechanism.

In FIG. 3, the charge motor 401 is a drive source provided to drive the mirror charge mechanism. The charge motor 401 is an ordinary DC motor which generates a drive force when a voltage is applied to it. The charge motor 401 is controlled by a camera control unit. A pinion 401a is fixed to the drive shaft of the charge motor. The pinion 401a engages with a transmission gear rotatably mounted around a shaft 400a.

The transmission gear engages with a cam gear 403 provided rotatably around a shaft 400b. Therefore, when a voltage is applied to the charge motor 401, the charge motor 401 drives the cam gear 402 via the transmission gear 402. The cam 403 has a cam 403a formed on it. The cam 403a includes a cam top region, a cam lift region, and a cam bottom region, which are formed in succession.

A phase plate 404 is mounted to the shaft 400a. The phase plate 404 rotates in conjunction with the cam gear 403 around a shaft 400b. The phase plate 404 has a notch formed on it. As the phase plate 404 rotates, a photo interrupter 405 detects whether light passes through the notch or is blocked. The photo interrupter 405 has two sets of light emitting/receiving units, so that it can detect four phases of the cam gear 403.

The shaft 400c is fitted with a charge lever 406 as a charge member. The charge lever 406 is rotatably mounted around the shaft 400c. The charge lever 406 is urged by a charge return spring 407. On the charge lever 406, a charge bearing 406a and a charge roller 406b are formed in a freely rotatable manner. The charge bearing 406a is capable of contacting with the cam 403a of the cam gear 403, and the charge roller 406b is capable of contacting with the roller 310c of the charge portion of the mirror lever 310.

When the charge bearing 406a does not trace the surface of the cam 403a, the charge lever 406 contacts a charge lever stopper 408 by an urging force of a charge return spring 407. A charge lever stopper is formed by an elastic material, such as rubber, and reduces an impact produced by contact with the charge lever 406.

Figure 4A:
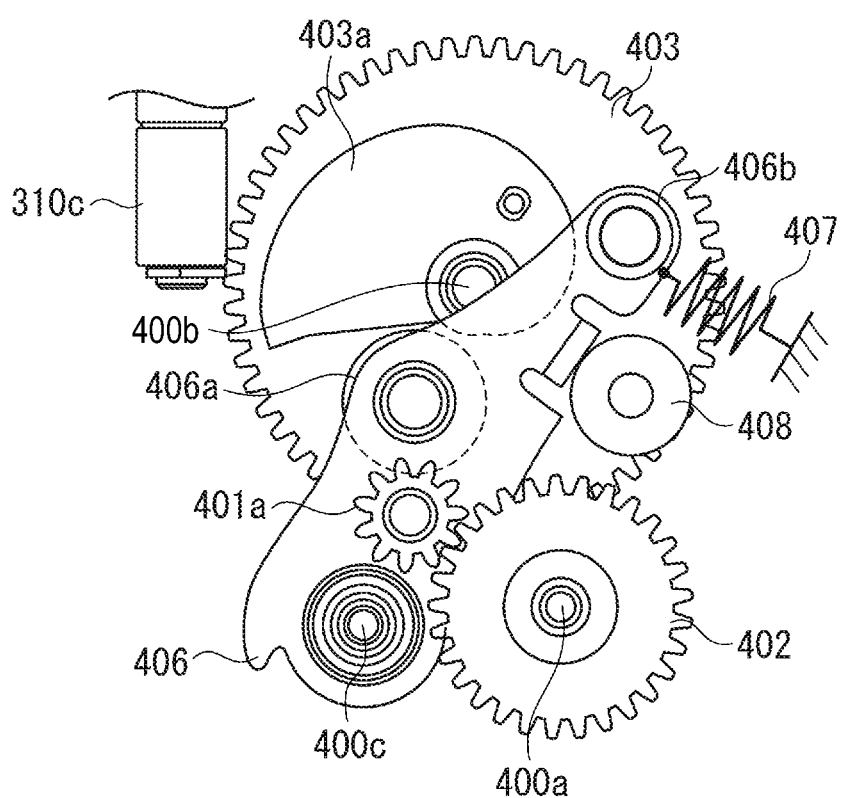
FIGS. 4A, 4B and 4C are diagrams illustrating the operation of the mirror charge drive mechanism.
Figure 4B:
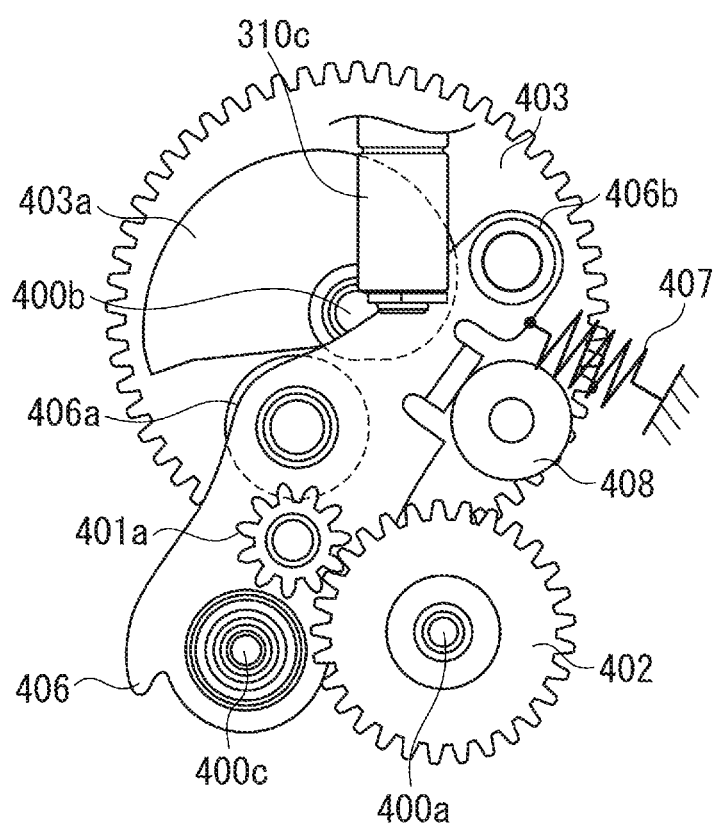
Figure 4C:
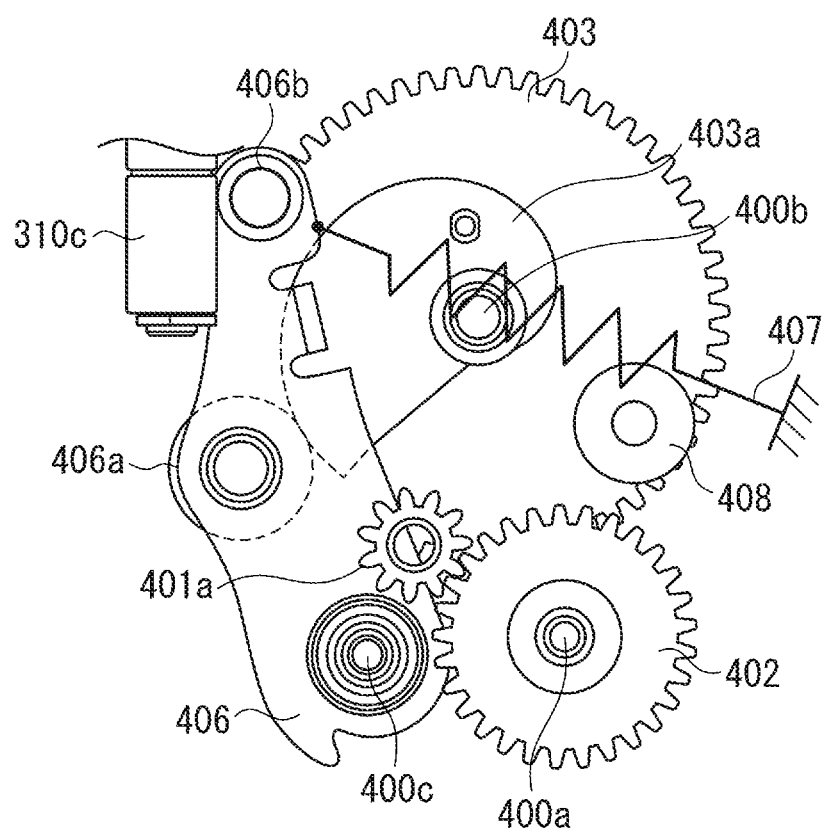

The operation of the mirror charge drive mechanism will now be described with reference to FIGS. 4A to 4C. FIGS. 4A to 4C are plan views of the mirror charge mechanism in FIG. 3, in which the charge motor 401 is not illustrated.

FIG. 4A illustrates the mirror charge drive mechanism in the stand-by mode before the shutter is released. More specifically, the mirror is in the down state and charge operations are completed. In other words, the state in FIG. 4A is the same as the state in FIG. 2A.

In the state illustrated in FIG. 4A, the charge lever 406 is in contact with the charge lever stopper 408 under the urging force of the charge return spring 407. At this time, the charge bearing 406a is located in a position facing the cam bottom region of the cam 403a, and the charge bearing 406a is not in contact with the cam 403a.

When an electric pulse is applied to the electromagnet 380 in response to a release signal, the engagement of the up hook lever 350 with the stopper 310a of the mirror lever 310 is released, the mirror lever 310 rotates to put the mirror into the up state as illustrated in FIG. 2B.

When the mirror is in the up state, if an electric pulse is applied to the electromagnet 380, the engagement of the down hook lever 340 with the stopper 320a of the mirror drive lever 320 is released, so that the mirror is put in the down state as illustrated in FIG. 2C.

FIG. 4B illustrates the state when the mirror down operation is finished. In other words, the state in FIG. 4B is the same as the state in FIG. 2C. As illustrated in FIG. 4B, when the mirror down operation is finished, the roller 310c provided at the charge portion of the mirror lever 310 has moved more to the right in FIG. 4B than in FIG. 4A. While the state of FIG. 4A is shifting to the state of FIG. 4B, the charge motor 401 is not driven. Therefore, only the roller 310c changes its position.

In the state in FIG. 4B, if a voltage is applied to the charge motor 401, the cam gear 403 starts to rotate clockwise as it is driven through a transmission gear 402.

When the gear cam 403 rotates clockwise, the charge bearing 406a contacts the cam 403a to rotate the charge lever 406 counterclockwise despite the urging force of the charge return spring 407. As the charge lever 406 rotates counterclockwise, the charge roller 406b contacts the roller 310c of the mirror lever 310, and moves the roller 310c of the mirror lever 310 to the left. As a result, the mirror lever 310 rotates clockwise around the rotational center 310d of the mirror lever 310 in defiance of the force of the mirror up spring 310Sp (Refer to FIG. 2C).

By the clockwise rotation of the mirror lever 310, the attraction cam 310b of the mirror lever 310 contacts the roller 360c of the detachment lever 360 to rotate the detachment lever 360 clockwise despite the force of the detachment spring 360Sp.

As the detachment lever 360 rotates clockwise, the attraction lever 370 is rotated clockwise to attract the attraction block 380a to the disengaged electromagnet 380.

By the clockwise rotation of the mirror lever 310, the down hook lever 340 comes into engagement with the stopper 320a of the mirror drive lever 320, and the up hook lever 350 comes into engagement with the stopper 310a of the mirror lever 310.

FIG. 4C illustrates the state where the charge lever 406 rotates counterclockwise and the mirror lever 310 rotates until the mirror lever 310 comes into the state as illustrated in FIG. 2A. In the state of FIG. 4C, if a voltage continues to be applied to the charge motor 401, the cam gear 403 rotates clockwise and the charge bearing 406a goes beyond the cam top region of the cam 403a. When the charge bearing 406a has passed the cam top region of the cam 403a, the charge return spring 407 urges the charge lever 406 to contact the charge lever stopper 408. At this stage, the mirror charge drive mechanism has returned to the state in FIG. 4A.

The photo interrupter 405 can detect phases of the cam gear as illustrated in FIG. 4A. When the photo interrupter 405 detects a phase of the cam gear 403 as illustrated in FIG. 4A, supply of voltage to the charge motor 401 is stopped and charge operations are terminated.

The mirror up operation in the second mirror drive mode will now be described with reference to FIG. 5.

In the mirror up operation in the first mirror drive mode, in response to a release signal, the camera drive unit applies an electric pulse to the electromagnet 380. In the mirror up operation in a second mirror drive mode, in response to a release signal, before the camera control unit applies a pulse to the electromagnet 380, the camera control unit supplies a voltage to the charge motor 401 while the state is shifting from FIG. 4A to the state in FIG. 5A. By this arrangement, like in the mirror charge operation described above, the cam gear 403 rotates clockwise and the charge lever 406 rotates counterclockwise in defiance of the force of the charge return spring 407. Consequently, the charge roller 406b of the charge lever 406 enters a moving locus of the mirror lever 310 in the mirror up operation.

Figure 5A:
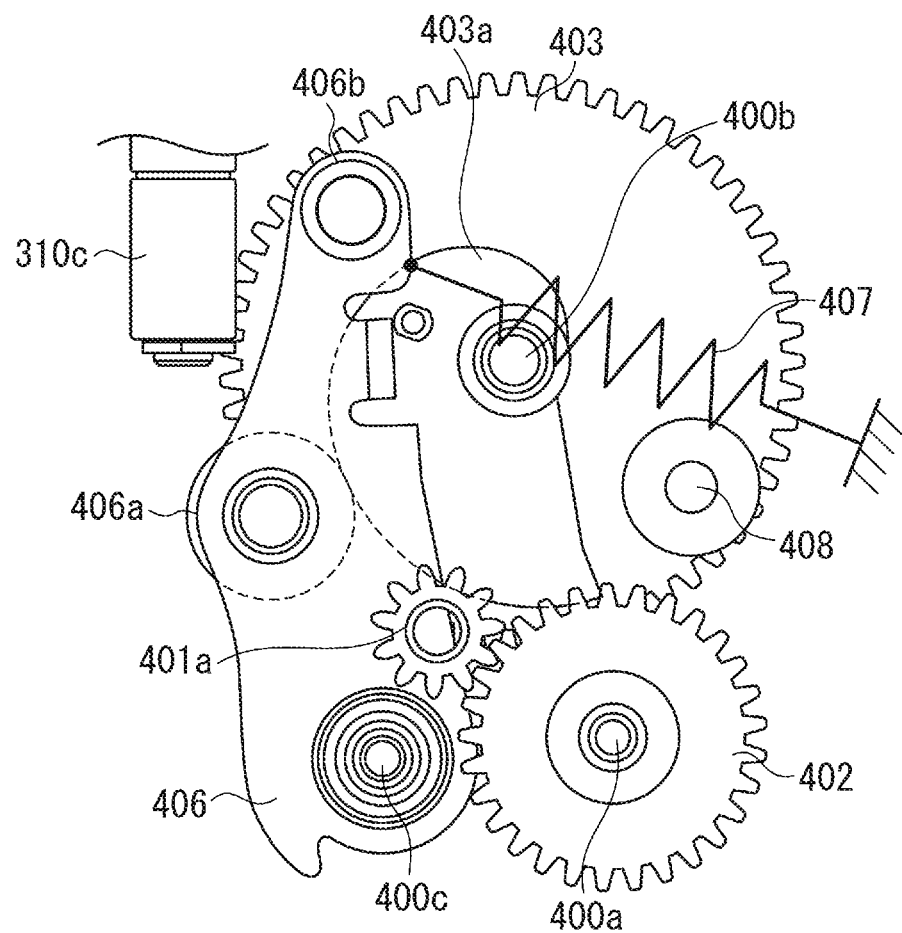
FIGS. 5A and 5B are diagrams illustrating a mirror up operation in a second mirror drive mode.

A photo interrupter 405 can detect a phase of the cam gear 403 that assumes the state in FIG. 5A. When the photo interrupter 405 detects the phase of the cam gear 403 in the state illustrated in FIG. 5A, the camera control unit stops supply of voltage to the charge motor 401. Even if the camera control unit stops the supply of voltage to the charge motor 401, the charge lever 406 maintains its state in FIG. 5A by a static friction of the mirror charge drive mechanism.

After the voltage supply to the charge motor 401 is stopped, the camera control unit applies an electric signal to the electromagnet 380. Consequently, the attraction lever 370 with the attraction block 380a fixed thereto, and the detaching lever 360 moving in conjunction with the attraction lever 370 are rotated counterclockwise around the rotational center 360a of the detaching lever 360 under the spring force of the detaching spring 360Sp.

When the detachment lever 360 rotates counterclockwise, the roller 360b of the detachment lever 360 contacts a contact portion 350b of the up hook lever 350, and the up hook lever 350 rotates counterclockwise around a rotational center 350a. When the up hook lever 350 rotates counterclockwise, the engagement of the up hook lever 350 with the stopper 310a of the mirror lever 310 is released.

When the engagement of the up hook lever 350 with the stopper 310a of the mirror lever 310 is released, the mirror lever 310 rotates counterclockwise around the rotational center 310d under the force of the mirror up spring 310Sp. When the mirror lever 310 rotates counterclockwise around the rotational center 310d, in FIG. 5A, the roller 310c of the mirror lever 310 moves rightward and contacts the charge roller 406b of the charge lever 406.

Figure 5B:
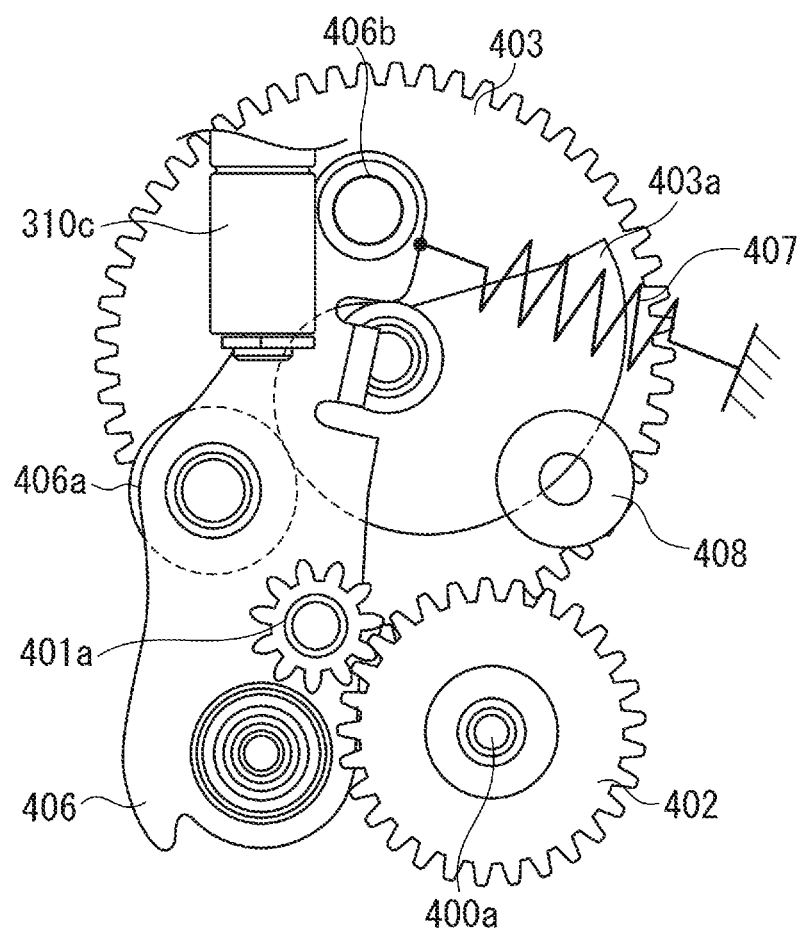

When the roller 310c contacts the charge roller 406b, by the force moving the roller 310c rightward, the mirror charge drive mechanism is pushed back into the state in FIG. 5B. The force that moves the roller 310c rightward, in other words, the force that rotates the mirror lever 310 around the rotational center 310d, is transferred through the charge lever 406, the cam gear 403, and the transmission gear 402, and can be used to rotate the charge motor 401.

At this time, since voltage is not being applied to the charge motor 401, the charge motor 401 functions as a drive load. In the present exemplary embodiment, the charge lever 406 enters the moving locus of the mirror lever 310 in the mirror up operation. However, for example, by using the cam gear 403, which is a part of the mirror charge mechanism, a similar operation and effect can also be achieved. In this case, the cam gear 403 is used as a charge member.

Like in the first mirror drive mode, since the stopper 320a of the mirror drive lever 320 is in engagement with the down hook lever 340, the mirror drive lever 320 rotates counterclockwise around the rotational center 310d of the mirror lever 310. In this case, the mirror up operation is performed when the main mirror drive shaft 102 is pushed up by the cam 320b of the mirror drive lever 320.

When the mirror lever 310 is in the mirror up state as illustrated in FIG. 2B, the mirror charge mechanism is in the same state as in FIG. 4B.

As described above, in the second mirror drive mode, when the mirror lever 310 is rotated by the urging force of the mirror up spring 310Sp, the mirror charge mechanism functions as a drive load. Therefore, it becomes possible to make the rotating speed of the mirror lever 310 in the mirror up operation slower than in the first mirror drive mode, so that the impact of the mirror up operation can be made smaller than in the first mirror drive mode.

Another exemplary embodiment will now be described.

In the mirror up operation in the second mirror drive mode described in the previous exemplary embodiment, when a release signal is input, the camera control unit continues to supply a voltage to the charge motor 401 until the mirror charge drive mechanism enters the state in FIG. 5A. In the state in FIG. 5A, driving of the charge motor 401 is stopped when there is a clearance between the roller 310c of the mirror lever 310 and the charge roller 406b of the charge lever 406. In contrast, in the present exemplary embodiment, until the charge roller 406b of the charge lever 406 comes into contact with the roller 310c of the mirror lever 310, the camera control unit may continue driving the charge motor 401.

In the mirror up operation in the second mirror drive mode in the previous exemplary embodiment, while the state is shifting from FIG. 5B to a state in FIG. 4B, the supply of voltage to the charge motor 401 is suspended. In the present exemplary embodiment, while the state is shifting from FIG. 5B to the state in FIG. 4B, by continuing the voltage supply to the charge motor 401, the drive load can be increased. By doing so, the rotating speed of the mirror lever 310 in the mirror up operation can be made slower.

At this time, because the voltage supplied to the charge motor 401 is controlled by the camera control unit, the magnitude of the drive load can be adjusted. Therefore, the rotating speed of the mirror lever 310 in the mirror up operation can be adjusted.

In the present exemplary embodiment, the completion of the mirror up operation is detected by the up switch 303. In addition to this method, by detecting a state immediately before a completion of the mirror up operation, according to a result of the detection, voltage supply to the charge motor 401 can be started. By executing this step, the drive load of the charge motor 401 can be used to apply the brake on the mirror lever 310. In this case, too, by causing the camera control unit to adjust a voltage supplied to the charge motor 401, the force of the brake can be adjusted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-094174 filed Apr. 20, 2011, which is hereby incorporated by reference herein in its entirety.

What is claimed is:

1. A camera, comprising:
a mirror;
a mirror drive member configured to drive the mirror by moving between a first and a second position;
a mirror drive spring configured to urge the mirror drive member to the first position;
a charge member configured to charge the mirror drive spring by moving the mirror drive member from the first position to the second position; and
a drive source configured to drive the charge member,
wherein the drive source is driven so that the charge member enters a moving locus of the mirror drive member when the mirror drive member is driven from the second position to the first position, and
wherein after the charge member has entered the moving locus, the mirror drive member is moved from the second position to the first position by an urging force of the mirror drive spring.

2. The camera according to claim 1, wherein when the mirror drive member comes into the first position, the mirror is put in an up position, and
wherein when the mirror drive member comes into the second position, the mirror is put in a down position.

3. The camera according to claim 1, wherein the drive source includes a motor,
wherein electric power is applied to the motor so that the charge member enters the moving locus of the mirror drive member when the mirror drive member is driven from the second position to the first position,
wherein after the charge member has entered the moving locus, the power applied to the motor is stopped, and
wherein after the power applied to the motor has been stopped, the mirror drive member is moved from the second position to the first position by the urging force of the mirror drive spring.

4. The camera according to claim 1, wherein the drive source includes a motor,
wherein electric power is applied to the motor so that the charge member enters the moving locus of the mirror drive member when the mirror drive member is driven from the second position to the first position,
wherein even after the charge member has entered the moving locus, the electric power continues to be applied to the motor, and
wherein while the electric power continues to be applied to the motor, the mirror drive member is moved from the second position to the first position by the urging force of the mirror drive spring.

5. The camera according to claim 1, wherein the camera selects either the first mirror drive mode or a second mirror drive mode,
wherein in a case where the first mirror drive mode is selected, while the charge member is prevented from entering the moving locus of the mirror drive member when the mirror drive member is moved from the second position to the first position, the mirror drive member is moved from the second position to the first position by the urging force of the mirror drive spring, and
wherein in a case where the second mirror drive mode is selected, while the charge member has entered the moving locus of the mirror drive member, when the mirror drive member is moved from the second position to the first position, the mirror drive member is moved from the second position to the first position by the urging force of the mirror drive spring.

* * * * *